United States Patent [19]

Nancarrow

[11] Patent Number: 4,996,844

[45] Date of Patent: Mar. 5, 1991

[54] CONTROL SYSTEM FOR A THREE-WHEEL TURBOCHARGER

[75] Inventor: James H. Nancarrow, Mission Viejo, Calif.

[73] Assignee: Allied-Signal, Inc., Torrance, Calif.

[21] Appl. No.: 394,570

[22] Filed: Aug. 15, 1989

[51] Int. Cl.$^5$ ............................................. F02B 37/10
[52] U.S. Cl. ....................................... 60/608; 60/418; 60/468
[58] Field of Search ................. 60/418, 468, 607, 608

[56] References Cited

U.S. PATENT DOCUMENTS

| | | |
|---|---|---|
| 4,285,200 | 8/1981 | Byrne et al. |
| 4,322,949 | 4/1982 | Byrne et al. |
| 4,444,014 | 4/1984 | Kobayashi et al. ................... 60/608 |
| 4,478,043 | 10/1984 | Kobayashi et al. |
| 4,622,817 | 11/1986 | Kobayashi ............................ 60/608 |

*Primary Examiner*—Michael Koczo
*Attorney, Agent, or Firm*—Poms, Smith, Lande & Rose

[57] ABSTRACT

A controller for a three wheel turbocharger receives input parameters from throttle or fuel rack position, manifold absolute pressure and accumulator pressure. The operating parameters are used by the controller to control the amount of hydraulic fluid applied to the third turbine wheel of the turbocharger through various operational modes including pump bypass, power transfer, lugging or override, and accumulator charging modes. The controller is designed so that a simple moveable shuttle within a cylindrical housing provides various valve functions interconnecting the various components.

12 Claims, 4 Drawing Sheets

FIG. 2
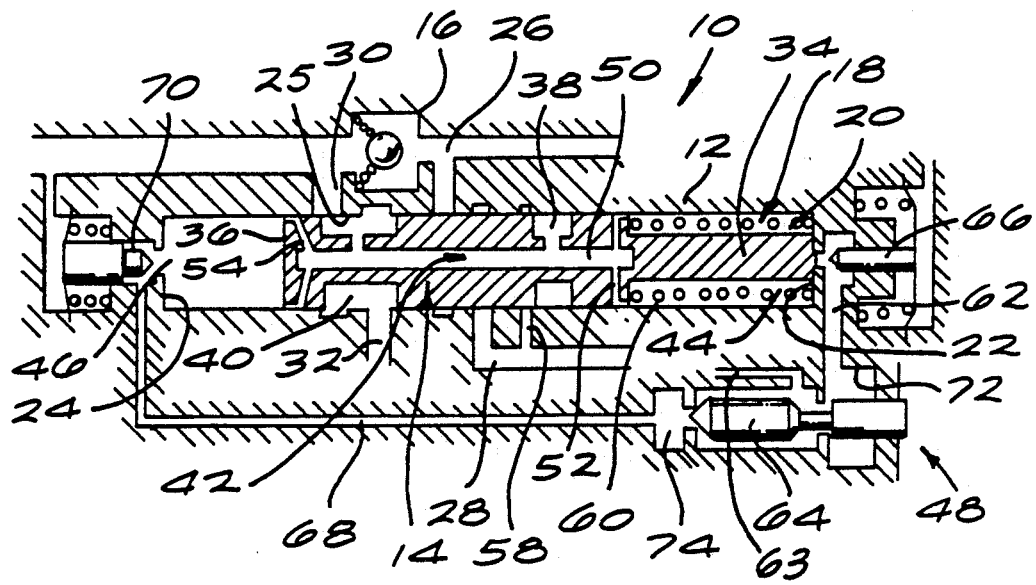
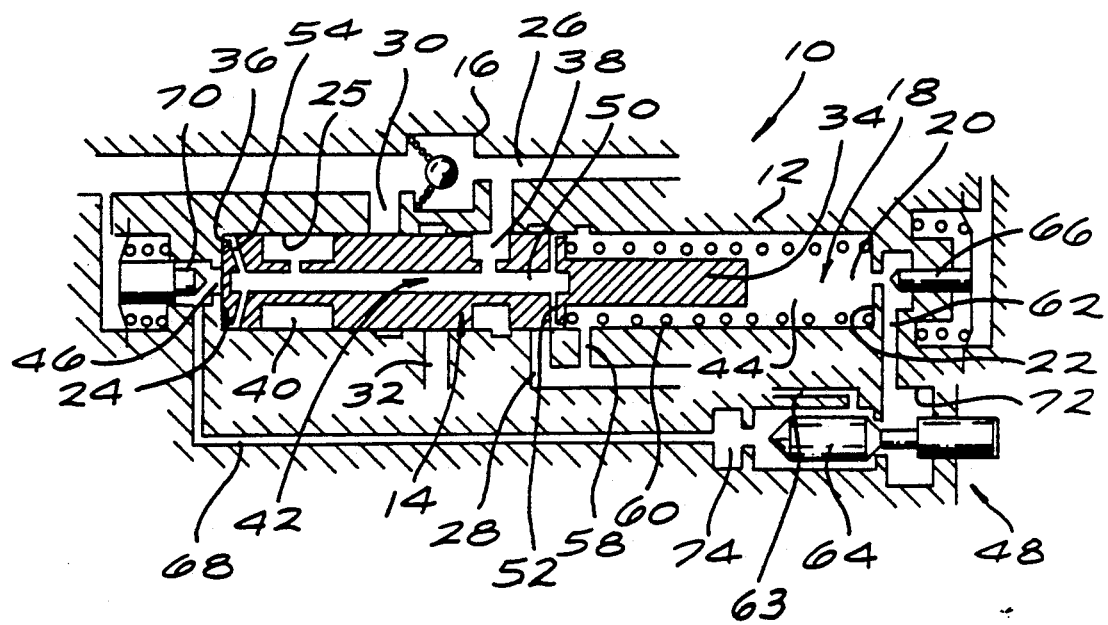
FIG. 3

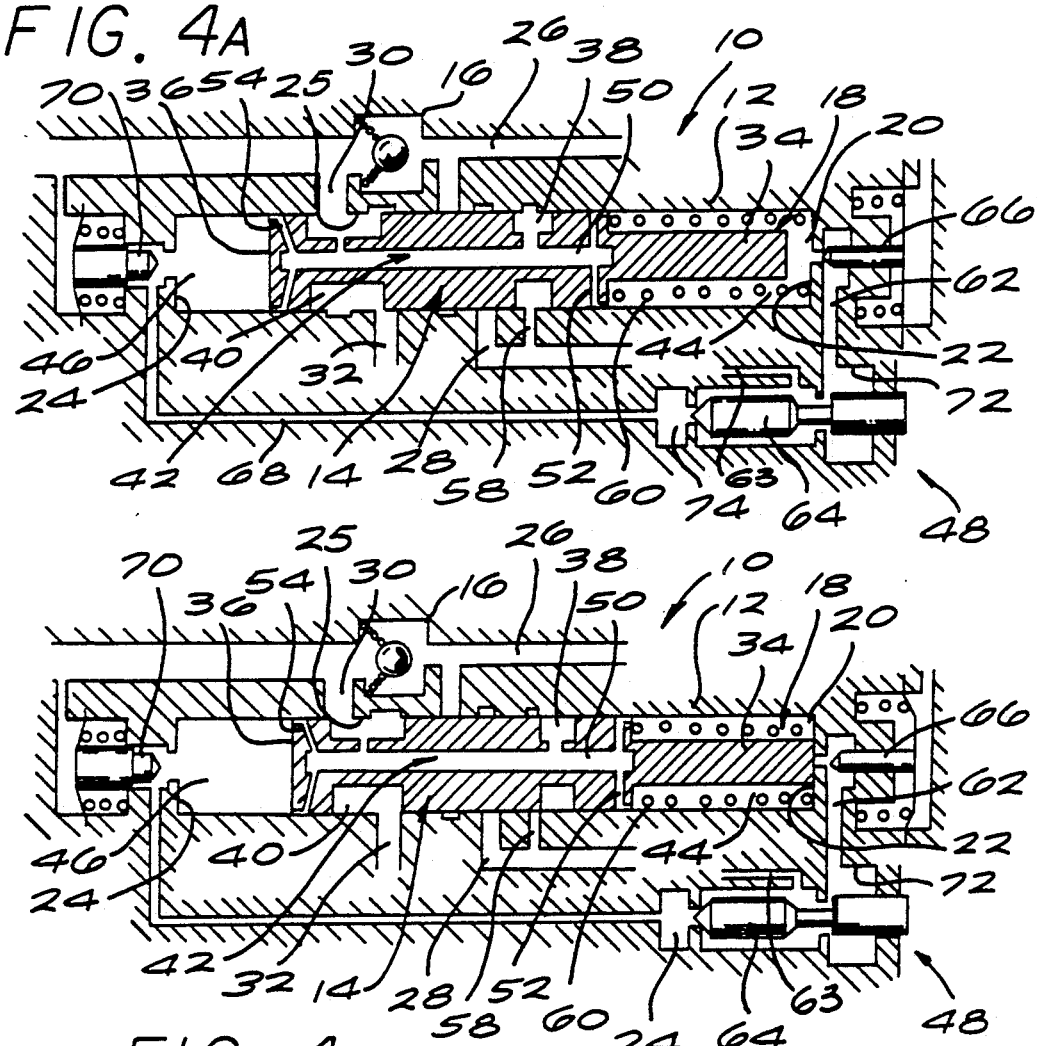
FIG. 4A
FIG. 4B
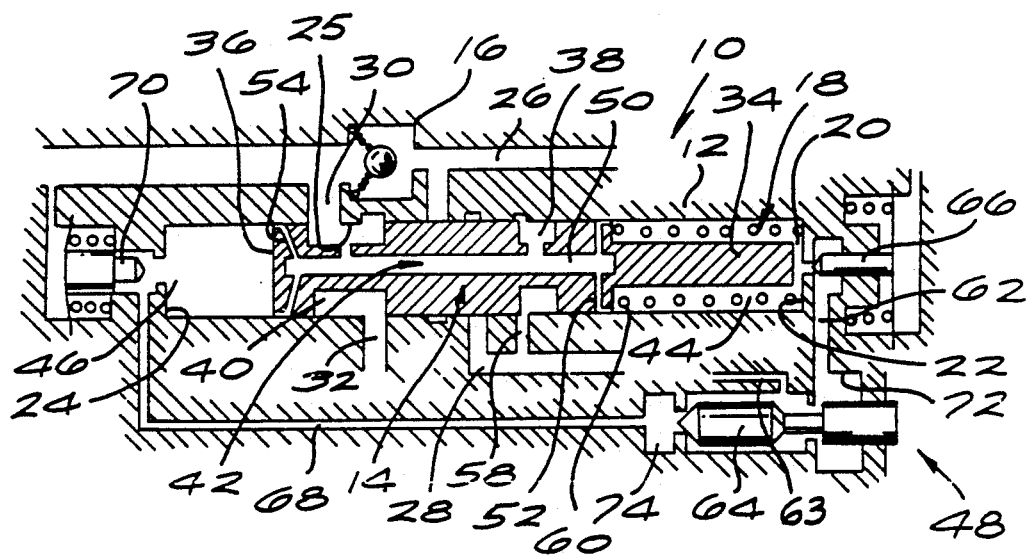
FIG. 4C

CONTROL SYSTEM FOR A THREE-WHEEL TURBOCHARGER

The present application for letters patent is related to a prior U.S. application Ser. No. 07/303,448 filed Jan. 27, 1989, for a Controller for a Three-wheel Turbocharger, which has been assigned to the assignee of the present invention and which is incorporated herein by reference.

BACKGROUND OF THE INVENTION

1. Field of the Invention

The present invention relates to a control system for a three-wheel turbocharger and, more particularly, to an improved control system which utilizes identified engine parameters to control the flow of turbocharger hydraulic fluid to the third turbine wheel of the three-wheel turbocharger.

2. Discussion of the Related Art

In the above-referenced prior application, there is disclosed a controller for a three-wheel turbocharger, and in one particular embodiment thereof a control system which utilizes an accumulator. The accumulator is provided to store hydraulic fluid at a high pressure. In certain engine operating conditions wherein the high pressure hydraulic fluid is needed to drive the third wheel of the turbocharger, high pressure fluid is available from both the accumulator and the high-pressure hydraulic pump. The delivery of the hydraulic fluid to the turbine wheel of the turbocharger is controlled by a control valve manifold. The manifold has a plurality of nozzles to regulate the flow of the hydraulic fluid to the third turbine wheel. The primary advantages achieved by storing high pressure fluid in the accumulator is that parasitic power losses are reduced and a lower capacity high-pressure pump may be utilized as described in the prior application.

SUMMARY OF THE INVENTION

It is an object of the present invention to provide a simplified control system which routes hydraulic fluid to the third turbine wheel of a three-wheeled turbocharger when needed for engine acceleration or for preventing lugging. It is a further object of the present invention to provide for charging and discharging of the accumulator. It is another object of the present invention to provide such a control system which regulates flow of the hydraulic fluid to the turbocharger. It is still a further object of the present invention to provide a central control system which responds to engine fuel pump rack position and to bypass hydraulic fluid when power to the three-wheel turbocharger is not desired.

According to the present invention, a novel control system includes a housing having a generally cylindrical interior chamber, a first conduit adapted to communicate the chamber with the outlet of the high pressure pump, a second conduit adapted to communicate the chamber with the inlet of the high pressure pump, a third conduit adapted to communicate the accumulator with the chamber and the fourth conduit adapted to communicate the third turbine wheel with the chamber. The control system also includes a generally cylindrical shuttle disposed within the chamber. The shuttle is radially dimensioned to be in axially slidable engagement between a first position, a second position, and a third position. The shuttle has a first channel and a second channel. When the shuttle is in its first position, the first channel communicates between the first conduit and the second conduit such that high-pressure fluid from the outlet bypasses each of the turbine and accumulator. The high pressure fluid then returns to the high pressure pump inlet. When the shuttle is in the second position, the second channel communicates between the third and fourth conduits so that the high pressure hydraulic fluid from the accumulator is made available to the third turbine wheel. In the third position, the shuttle blocks the second, third and fourth conduits. A one-way valve is communicatively coupled between the first conduit and the third conduit to allow flow of the high pressure hydraulic fluid from the outlet of the pump to the accumulator thereby recharging the accumulator. The control system further includes means for biasing the shuttle in one of the first position, second position and third position in response to engine operating parameters. In one particular embodiment of the present invention, the shuttle position may be modulated about the second position to regulate flow of the hydraulic fluid to the turbocharger.

An advantage of the present invention is that the control system housing and shuttle provide a simple apparatus which accomplishes the results obtained by several valves disclosed in the above-referenced application. Such simplification will increase system reliability and longevity.

These and other objects, advantages and features of the present invention will become readily apparent to those skilled in the art from a study of the following description of an exemplary preferred embodiment when read in conjunction with the attached drawing and appended claims.

BRIEF DESCRIPTION OF THE DRAWINGS

FIG. 2 is a schematic diagram similar to FIG. 1 with the shuttle in the second position to deliver hydraulic fluid to the third wheel of the turbocharger;

FIG. 3 is a schematic diagram similar to FIG. 1 showing the shuttle in the third position to charge the accumulator;

FIGS. 4A-4C are schematic diagrams similar to FIG. 1 showing modulation of the shuttle position about the second position to regulate flow of hydraulic fluid to the turbocharger during full throttle, low rpm engine conditions.

DESCRIPTION OF AN EXEMPLARY PREFERRED EMBODIMENT

Figure 5:
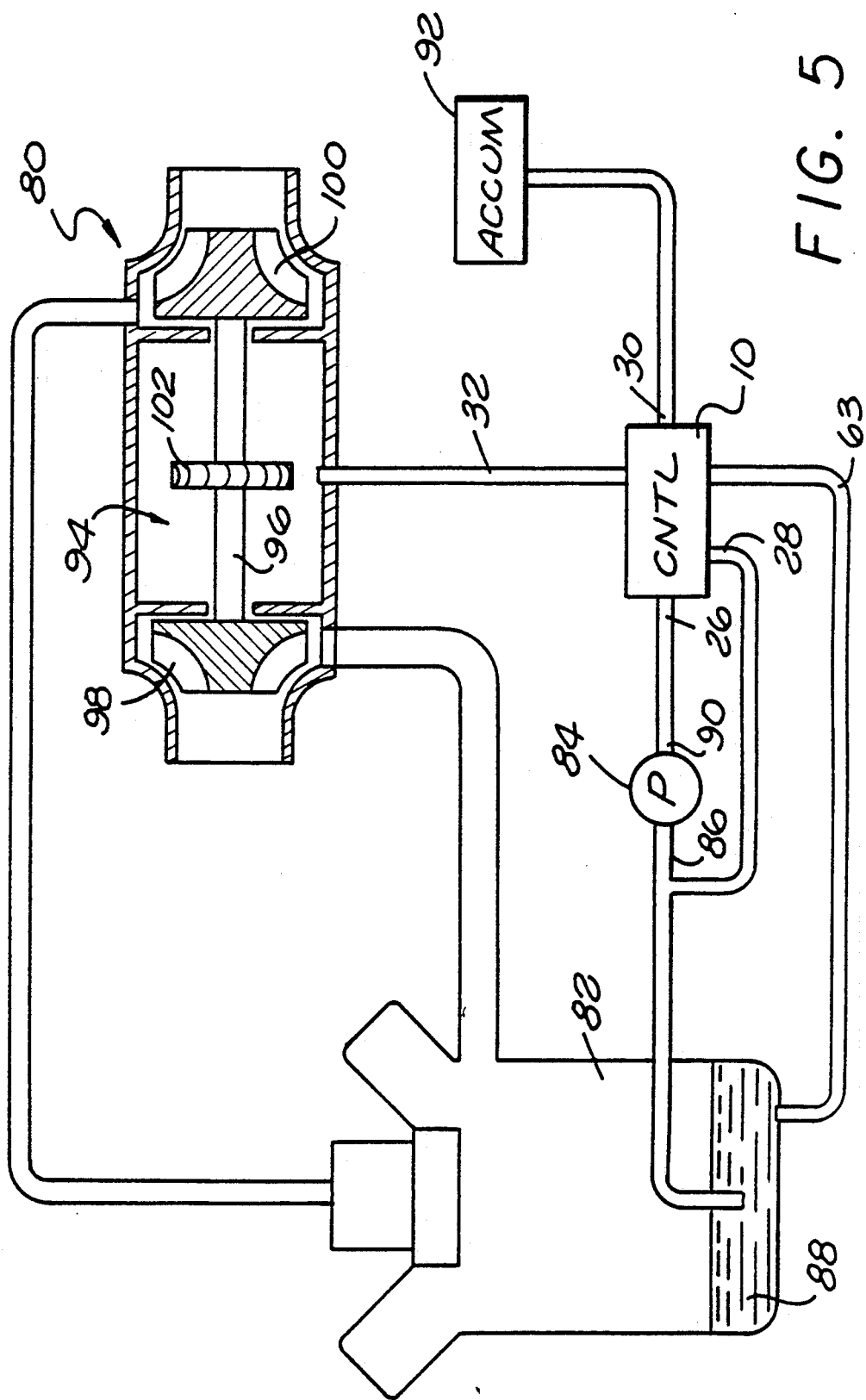
FIG. 5, illustrates and exemplary environment for the control system of FIG. 1.

The present invention is adapted for use in an engine turbocharger system of the type disclosed in the above-referenced commonly owned prior application incorporated herein by reference. So that the more casual reader may obtain an appreciation of the present invention without referring to the prior application, those elements disclosed therein, with which the present invention interacts, are set forth immediately below. As disclosed in the prior application, and as shown in FIG. 5 hereto, a turbocharger system 80 for an engine 82 includes a high pressure pump 84 which has an inlet 86 adapted for receiving hydraulic fluid from a reservoir, such as a crankcase 88, and an outlet 90 for providing high-pressure hydraulic fluid. The turbocharger system 80 may also include an accumulator 92 for storing the high-pressure hydraulic fluid and a three-wheel turbocharger 94 having a rotatable shaft 96 which supports each of a first turbine wheel 98 adapted to be driven by exhaust gas, a second turbine wheel 100 adapted to compress intake air and a third turbine wheel 102 selectively driven by high-pressure hydraulic fluid.

Referring now to FIGS. 1–4, a novel control system 10 for the above turbocharger system 80 includes a housing 12, a generally cylindrical shuttle 14, a one-way valve 16, and means 18 for biasing the shuttle in one of the positions shown in FIGS. 1–4.

The housing 12 includes a generally cylindrical chamber 20 formed by a first end wall 22, a second end wall 24 and a cylindrical wall 25 extending between the first end wall 22 and the second end wall 24. The housing 12 further includes a first conduit 26 adapted to communicate the 90 of the high-pressure pump 84 with the chamber 20, a second conduit 28 adapted to communicate the chamber 20 with the inlet 86 of the high pressure pump 84, a third conduit 30 adapted to communicate the chamber 20 with the accumulator, and a fourth conduit 32 adapted to communicate 92 the chamber 20 with the third turbine wheel 102 of the three-wheel turbocharger 94.

The shuttle 14 is radially dimensioned to be in axially slidable engagement with the cylindrical wall 25. The shuttle 14 is movable between a first position as shown in FIG. 1, a second position as shown in FIG. 2, and a third position as shown in FIG. 3. The shuttle 14 includes a first end 34 in a facing relationship to the first end wall 22 of the chamber 20, a second end 36 in a facing relationship to the second end wall 24 of the chamber 20, a first channel 38 and a second channel 40. In a preferred embodiment of the present invention, each of the first channel 38 and second channel 40 are circumferential annular channels axially spaced from each other on the shuttle 14.

Figure 1A:
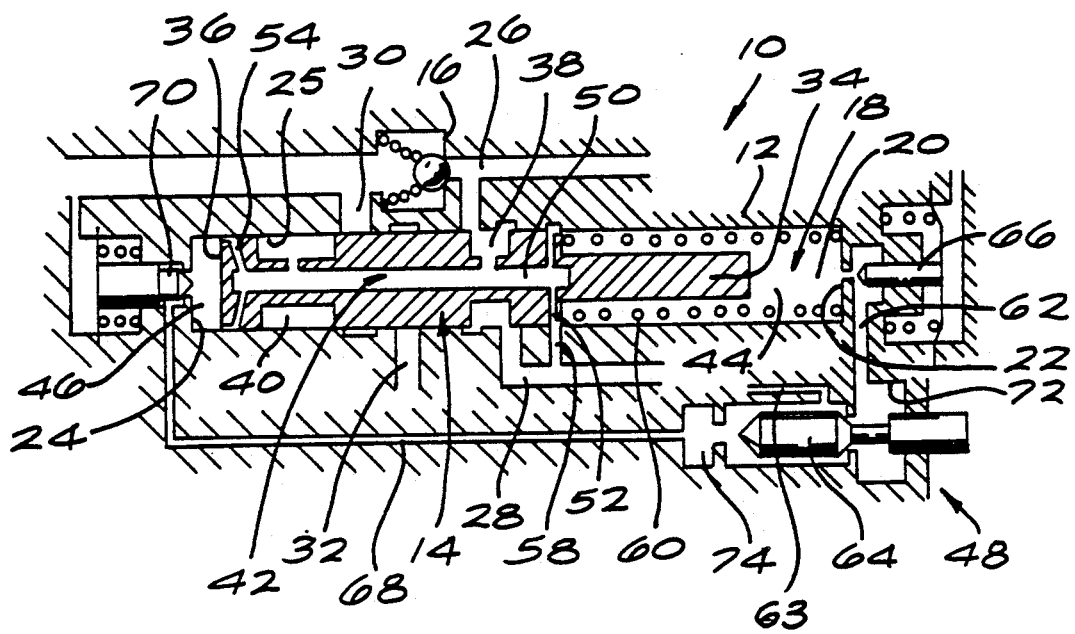
FIGS. 1A and 1B are schematic diagrams illustrating a control system constructed in accordance with the present invention with the shuttle in the first, or bypass, position for low engine and high engine power conditions, respectively.

When the shuttle is in the first position as best seen in FIG. 1A, the first channel 38 communicates between the first conduit 26 and the second conduit 28. The shuttle further blocks the third conduit 30 and the fourth conduit 32. In this position, the control system 10 directs the high pressure fluid to bypass the accumulator 92 and turbocharger 94. The high pressure fluid then returns from the outlet 90 of the high pressure pump 84 back to its inlet 86 to reduce parasitic losses.

When the shuttle is in the second position as best seen in FIG. 2, the second channel 40 communicates between the third conduit 30 and the fourth conduit 32 and further blocks the first conduit 26 and the second conduit 28. In the second position, the control system 10 is delivering high-pressure hydraulic fluid from the accumulator 92 to the third wheel 102 of the turbocharger 94. Because of the delivery of hydraulic fluid from the accumulator 92, the pressure of the hydraulic fluid in the accumulator 92 has dropped thereby causing high-pressure fluid from the high-pressure pump outlet 90 to be delivered to the third conduit 30 through the one-way valve 16.

Accordingly, the one-way valve 16 is coupled between the first conduit 26 and the third conduit 30 to allow flow of the high pressure hydraulic fluid from the outlet 90 of the high pressure pump 84 to the accumulator 92. The one-way valve 16 is also open, as best seen in FIG. 3, when the shuttle 14 is in the third position blocking each of the second conduit 28, the third conduit 30 and the fourth conduit 32. In the third position, the pressure of the hydraulic fluid in the first conduit 26 from the high-pressure pump outlet 90 continuously increases until it exceeds the pressure of the fluid in the accumulator 92. The one-way valve 16, as a result of the increased pressure in the first conduit 26, opens to recharge the accumulator 92.

The biasing means 18 is responsive to various engine operating parameters and will bias the shuttle 14 in one of the first, second and third positions of FIGS. 1, 2 and 3, as will be described in greater detail immediately hereinbelow. The biasing means 18 includes means 42 for introducing hydraulic fluid into each of a first chamber portion 44 of the chamber 20 and a second chamber portion 46 of the chamber 20. The first chamber portion 44 is formed between the first wall 22 and the first end 34 of the shuttle 14. Similarly, the second chamber portion 46 is formed between the second wall 24 and the second end 36 of the shuttle 14. Biasing means 18 further includes means 48 responsive to engine operating parameters for regulating pressure of the hydraulic fluid in each of the first chamber portion 44 and the second chamber portion 46 to develop a varying pressure differential between pressure of the hydraulic fluid in the first chamber portion 44 and the pressure of the fluid in the second chamber portion 46 to cause the shuttle 14 to move between each of the above-described first position, second position and third position.

Introducing means 42 includes a third channel 50 in the shuttle 14 communicating with each of the first channel 38 and the second channel 40, at least one first bleed tube 52 communicating the third channel 50 with the first chamber portion 44, and at least one second bleed tube 54 communicating the third channel 50 with the second chamber portion 46. The first bleed tube 52 extends to the first end 34 of the shuttle 14 and the second bleed tube 54 extends to the second end 36 of the shuttle 14 to allow communication of hydraulic fluid into the first chamber portion 44 and the second chamber portion 46, respectively.

Regulating means 48 includes a fifth conduit 58 in the housing 12 communicating the chamber 20 with the inlet 86 of the high-pressure pump 84 and a spring 60. The fifth conduit 58 is partially communicative with each of the first bleed tube 52 and the first chamber portion 44 when the shuttle 14 is in its first position (FIG. 1) such that the pressure of the hydraulic fluid in the first chamber portion 44 is less than the pressure of the hydraulic fluid in the second chamber portion 46. The spring 60 has a spring constant selected to normally bias the shuttle 14 in the first position. In a preferred embodiment of the present invention, the first end 34 of the shuttle 14 is of reduced diameter such that the spring 60 is further disposed coaxially over the first end 34 of the shuttle 14 so that the first end 34 of the shuttle contacts the first wall 22 when in the second position (FIG. 2). Regulating means 48 further includes a sixth conduit 62 in the housing communicating the first chamber portion 44 with the reservoir 88 through a return conduit 63, a first valve 64 and a boost limiter valve 66.

The first valve 64 normally blocks the sixth conduit 62 and opens in response to the throttle position indicative of high engine power. When the valve 64 opens the sixth conduit 62, the first chamber portion 44 communicates with the reservoir 88. Accordingly, there is a decrease of pressure of the hydraulic fluid in the first chamber portion 44 causing the shuttle 14 to move to its second position as seen in FIG. 2.

The boost limiter valve 66 is normally biased so that the sixth conduit 62 is open and in communication with the first chamber portion 44. In response to intake air compressed by the turbocharger 94 reaching a preselected maximum pressure the boost limiter valve 66 blocks the sixth conduit 62 from communication with the first chamber 44. For example, the boost limiter valve 66 may be a diaphragm valve wherein intake manifold pressure overcomes the spring force on the diaphragm to close the boost limiter valve 66. The pressure of the hydraulic fluid in the first chamber portion 44 increases after the boost limiter valve 66 closes to return the shuttle 14 to the first position.

Regulating means 48 further includes a seventh conduit 68 in the housing 12 communicating the second chamber portion 46 with the reservoir 88 through return conduit 63 and an unloader valve 70. The unloader valve 70 normally blocks the seventh conduit 68 and opens the seventh conduit 68 in response to pressure of the hydraulic fluid in the accumulator 92 dropping below a preselected maximum pressure caused when the shuttle 14 is in the second position of FIG. 2. For example, the unloader valve 70 may have spring-loaded diaphragm wherein pressure of the hydraulic fluid in the accumulator 92, and in particular, the third conduit 30, counteracts the spring force to maintain the unloader valve 70 closed when pressure of the hydraulic in the accumulator 92 fluid is above a preselected minimum.

The first valve 64 also blocks the seventh conduit 68 when the throttle position is indicative of high engine power to maintain the shuttle 14 in the second position of FIG. 2. After throttle position is decreased, the first valve 64 opens the seventh conduit 68 to reduce pressure of the hydraulic fluid in the second portion 46 of the chamber 20 to move the shuttle 14 from the second position, through the first position to the third position of FIG. 3 to charge the accumulator 92. When the pressure of the hydraulic third has built up in the accumulator 92, the unloader valve 70 subsequently blocks the seventh conduit 68 to return the shuttle 14 to the first position.

The sixth conduit 62 includes an expansion chamber 72 disposed intermediate the first valve 64 and the boost limiter valve 66. Similarly, the seventh conduit 68 includes an expansion chamber 74 disposed intermediate the first valve 64 and the unloader valve 70. The purpose of the expansion chambers 72, 74 is to allow some of the hydraulic fluid in each of the first portion 44 and the second portion 46 of the chamber 20 to be displaced when either the boost limiter valve or the unloader valve 66 70 opens when the respective one of the sixth conduit 62 and the seventh conduit 68 is blocked by the first valve 64.

Figure 1B:
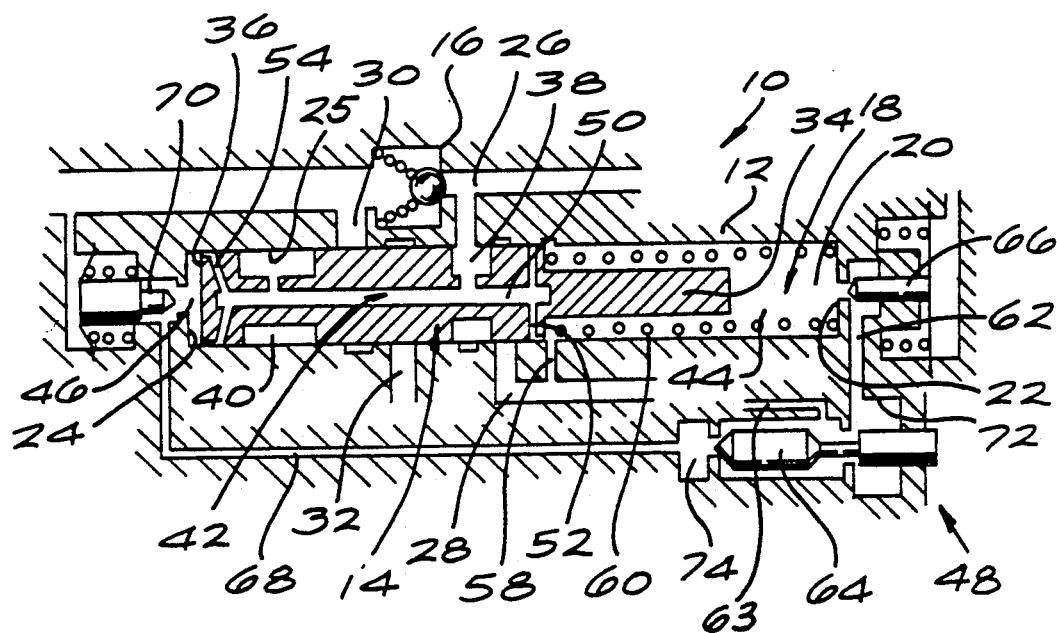

For example, with particular reference to FIG. 1B, it is seen after the boost limiter valve 66 closes, the pressure of the hydraulic fluid in the first chamber portion 44 of the chamber 20 increases with the boost limiter valve 66 blocking the sixth conduit 62. With the unloader valve 70 open, the shuttle 14 overshoots the first position of FIG. 1 until the fifth conduit 58 is fully communicative with the first chamber portion 44 and the first, channel 38 is communicative with the first conduit 26 and partially communicative with the second conduit 28. The expansion chamber 74 allows fluid to be displaced from the second portion 46 of the chamber 20 into the expansion chamber 70, thereby causing the shuttle 14 to assume the position shown in FIG. 1B. In this position, bypassing is still achieved while the first valve 64 blocks the seventh conduit 68 indicating wide throttle for high engine power demands after the pressure of the compressed intake air has reached a preselected maximum.

With particular reference with FIGS. 4A-4C, there is shown an operating condition wherein the boost limiter valve 66 modulates between a position blocking the sixth conduit 62 and partially opening the sixth conduit 62. Modulation of the boost limiter valve 66 modulates pressure of the hydraulic fluid in the first chamber portion 44 to modulate the position of the shuttle 14 about its second position shown in FIG. 2. This modulation is desirable wherein the engine 82 is being operated in a low rpm high load condition. In such a condition, the exhaust air is insufficient to drive the turbocharger 94 to achieve the desired levels of intake air compression or boost desirable. Accordingly, the low levels of intake air compression cause the boost limiter valve 66 to be partially open wherein the wide throttle position causes the first valve 64 to block the seventh conduit 68.

There has been described above a novel control system for a three-wheel turbocharger. Those skilled in the art may now make numerous uses of and departures from the description of the preferred exemplary embodiment hereinabove without departing from the inventive concepts disclosed herein. Accordingly, the present invention is to be defined and protected solely by the scope of the following claims.

What is claimed is:

1. In a turbocharger system for an engine including a high-pressure pump having an inlet adapted for receiving fluid from a reservoir and an outlet for providing high-pressure fluid, an accumulator for storing said high-pressure fluid, and a turbocharger having a rotatable shaft which supports each of a first turbine wheel adapted to be driven by exhaust gas, a second turbine wheel adapted to compress intake air and a third turbine wheel selectively driven by said high-pressure fluid, a control system comprising:

a housing including a generally cylindrical chamber formed by a first end wall, a second end wall and a cylindrical wall extending between said first end wall and said second end wall, a first conduit adapted to communicate said outlet with said chamber, a second conduit adapted to communicate said inlet with said chamber, a third conduit adapted to communicate said accumulator with said chamber, and a fourth conduit adapted to communicate said third turbine wheel with said chamber;

a generally cylindrical shuttle radially dimensioned to be in axially slidable engagement with said cylindrical wall and movable between a first position, a second position and a third position, said shuttle including a first end in a facing relationship to said first end wall, a second end in a facing relationship to said second end wall, a first channel and a second channel, said first channel communicating between said first conduit and said second conduit when said shuttle is in said first position, said shuttle blocking said third conduit and said fourth conduit when in said first position, said second channel communicating between said third conduit and said forth conduit when said shuttle is in said second position, said shuttle blocking said first conduit and said second conduit when in said second position;

a one-way valve coupled between said first conduit and said third conduit to allow flow of said high-pressure fluid from said outlet to said accumulator when said shuttle is in said third position blocking said second conduit, said third conduit and said fourth conduit; and means for biasing said shuttle in one of said first position, said second position and said third position in response to engine operating parameters.

2. A control system as set forth in claim 1, wherein said biasing means includes:

means for introducing said fluid into each of a first portion of said chamber between said first end wall and said first end of said shuttle and a second portion of said chamber between said second end wall and said second end of said shuttle; and means for responsive to said engine operating parameters for regulating pressure of said fluid in each of said first portion of said chamber and said second portion of said chamber to develop a varying pressure differential between pressure of said fluid in said first portion and pressure of said fluid in said second portion to cause such shuttle to move between each of said first position, said second position and said third position.

3. A control system as set forth in claim 2 wherein said introducing means includes:

a third channel in said shuttle communicating with each of said first channel and said second channel;

at least one first bleed tube in said shuttle communicating said third channel with said first portion of said chamber; and at least one second bleed tube in said shuttle communicating said third channel with said second portion of said chamber.

4. A control system as set forth in claim 2 wherein said regulating means includes:

a fifth conduit in said housing communicating said chamber with said inlet, said fifth conduit being partially communicative with each of said first bleed tube and said first portion of said chamber when said shuttle is in said first position such that pressure of said fluid in said first portion is less than the pressure of said fluid in said second portion of said chamber; and a spring being disposed between said first end wall and said first end of said shuttle and having a spring constant selected to normally bias said shuttle toward said first position.

5. A control system as set forth in claim 4 wherein said regulating means further includes:

a sixth conduit in said housing communicating said first portion of said chamber with said reservoir;

a first valve normally blocking said sixth conduit and opening in response to a throttle position indicative of high engine power to decrease pressure of said fluid in said first portion of said chamber to move said shuttle to said second position; and a boost limiter valve normally opening said sixth conduit and blocking said sixth conduit in response to said intake reaching a preselected maximum pressure, pressure of said fluid in said first portion of said chamber, thereby increasing to return said shuttle to said first position.

6. A control system as set forth in claim 5 wherein pressure of said fluid in said first portion of said chamber increases with said boost limiter valve blocking said sixth conduit until said shuttle returns to and overshoots said first position until said fifth conduit is fully communicative with said first portion of said chamber and said first channel is communicative with said first conduit and partially communicative with said second conduit.

7. A control system as set forth in claim 5 wherein said regulating means further includes:

a seventh conduit in said housing communicating said second portion of said chamber with said reservoir; and an unloader valve normally blocking said seventh conduit and opening said seventh conduit in response to pressure of said fluid in said accumulator dropping below a preselected maximum pressure caused by said shuttle being in said second position, said first valve further blocking said seventh conduit when said throttle position is indicative of high engine power to maintain said shuttle in said second position and opening said seventh conduit to reduce pressure of said fluid in said second portion of said chamber to move said shuttle to said third position after said shuttle returns to said first position from said second position, said unloader valve subsequently blocking said seventh conduit to return said shuttle to said first position when pressure of said fluid in said accumulator reaches said preselected maximum pressure.

8. A control system as set forth in claim 7 wherein said seventh conduit includes an expansion chamber disposed intermediate said first valve and said unloader valve.

9. A control system as set forth in claim 5 wherein said sixth conduit further includes an expansion chamber disposed intermediate said first valve and said boost limiter valve.

10. A control system as set forth in claim 5 wherein said boost limiter valve modulates between a position blocking said sixth conduit and partially opening said sixth conduit to modulate pressure of said fluid in said first portion of said chamber to modulate the position of said shuttle about said second position, such that the pressure of said fluid in said fourth conduit is modulated.

11. A control system as set forth in claim 1 wherein said first channel and said second channel are circumferential annular channels axially spaced from each other.

12. A control system as set forth in claim 1 wherein said fluid is hydraulic fluid.

* * * * *